(12) United States Patent
Hutt et al.

(10) Patent No.: US 7,149,321 B2
(45) Date of Patent: Dec. 12, 2006

(54) ELECTRO-DYNAMIC LOUDSPEAKER MOUNTING SYSTEM

(75) Inventors: Steven W. Hutt, Bloomington, IN (US); William Neal House, Greenwood, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 557 days.

(21) Appl. No.: 10/428,314

(22) Filed: May 2, 2003

(65) Prior Publication Data

US 2004/0026585 A1 Feb. 12, 2004

Related U.S. Application Data

(60) Provisional application No. 60/380,001, filed on May 2, 2002, provisional application No. 60/378,188, filed on May 6, 2002, provisional application No. 60/391,134, filed on Jun. 24, 2002.

(51) Int. Cl.
*H04B 1/00* (2006.01)
*H04R 1/02* (2006.01)

(52) U.S. Cl. .......................... 381/389; 381/86; 381/87; 381/386

(58) Field of Classification Search ............ 381/86–87, 381/389, 396, 386, 433
See application file for complete search history.

(56) References Cited

U.S. PATENT DOCUMENTS

| 1,643,791 | A | 9/1927 | Sleplan |
|---|---|---|---|
| 3,141,071 | A | 7/1964 | Rich |
| 3,164,686 | A | 1/1965 | Tibbetts |
| 3,570,626 | A | 3/1971 | Mochida et al. |
| 3,654,403 | A | 4/1972 | Bobb |
| 3,674,946 | A | 7/1972 | Winey |
| 3,919,499 | A | 11/1975 | Winey |
| 4,037,061 | A | 7/1977 | von Recklinghausen |
| 4,210,786 | A | 7/1980 | Winey |
| 4,264,789 | A | 4/1981 | Kaizu et al. |
| 4,281,223 | A | 7/1981 | Ugaji et al. |
| 4,316,062 | A | 2/1982 | Beveridge |
| 4,384,173 | A | 5/1983 | Briefer et al. |
| 4,453,047 | A * | 6/1984 | Thompson .................. 381/395 |
| 4,468,530 | A | 8/1984 | Torgeson |
| 4,471,172 | A | 9/1984 | Winey |
| 4,471,173 | A | 9/1984 | Winey |

(Continued)

FOREIGN PATENT DOCUMENTS

FR 2 765 767 1/1999

OTHER PUBLICATIONS

"Dynamic Amplitude Shading of Electronically Steered Line Source Arrays," an Audio Engineering Society Preprint 3272; Richard Schmidmaier, Munchen, Germany; David G. Meyer, School of Electrical Engineering, Purdue Univesity, West Lafayette, Indiana.

(Continued)

*Primary Examiner*—Sinh Tran
*Assistant Examiner*—Phylesha L Dabney
(74) *Attorney, Agent, or Firm*—Pauley Petersen & Erickson

(57) ABSTRACT

A mounting apparatus for attaching a device like an electro-dynamic loudspeaker to a mounting location in an automobile or other vehicle. The mounting apparatus employs bracket hardware that is either affixed to or integral with the loudspeaker that is to be mounted. The mounting apparatus can position the loudspeaker in a fixed angular orientation, or enable the angular orientation of the loudspeaker to be variable, as desired, to achieve the optimum performance of the loudspeaker.

40 Claims, 13 Drawing Sheets

U.S. PATENT DOCUMENTS

| | | | |
|---|---|---|---|
| 4,480,155 A | 10/1984 | Winey | |
| 4,484,037 A | 11/1984 | Nieuwendijk et al. | |
| 4,536,623 A | 8/1985 | Larson | |
| 4,544,805 A | 10/1985 | Sawafuji et al. | |
| 4,584,439 A | 4/1986 | Paddock | |
| 4,653,103 A | 3/1987 | Mori et al. | |
| 4,703,510 A | 10/1987 | Larson | |
| 4,723,296 A | 2/1988 | Nieuwendijk et al. | |
| 4,750,257 A | 6/1988 | Larson | |
| 4,803,733 A | 2/1989 | Carver et al. | |
| 4,837,838 A | 6/1989 | Thigpen et al. | |
| 4,924,504 A | 5/1990 | Burton | |
| 4,939,784 A | 7/1990 | Bruney | |
| 5,021,613 A | 6/1991 | Garcia | |
| 5,148,493 A | 9/1992 | Bruney | |
| 5,195,143 A | 3/1993 | Spiegel et al. | |
| 5,283,836 A | 2/1994 | Trufitt | |
| 5,285,501 A * | 2/1994 | Castillo | 381/86 |
| 5,297,214 A | 3/1994 | Bruney | |
| 5,321,760 A * | 6/1994 | Gray | 381/86 |
| 5,414,229 A * | 5/1995 | Rocheleau et al. | 181/150 |
| 5,430,805 A | 7/1995 | Stevenson et al. | |
| 5,627,903 A | 5/1997 | Porrazzo et al. | |
| 5,764,595 A | 6/1998 | Power | |
| 5,850,461 A | 12/1998 | Zelinka | |
| 5,901,235 A | 5/1999 | Thigpen et al. | |
| 5,905,805 A | 5/1999 | Hansen | |
| 5,953,438 A | 9/1999 | Stevenson et al. | |
| 5,961,762 A | 10/1999 | Zelinka et al. | |
| 6,008,714 A | 12/1999 | Okuda et al. | |
| 6,097,830 A | 8/2000 | Zelinka et al. | |
| 6,104,825 A | 8/2000 | Thigpen | |
| 6,154,557 A | 11/2000 | Montour et al. | |
| 6,185,310 B1 | 2/2001 | Kermani et al. | |
| 6,320,967 B1 * | 11/2001 | Azima et al. | 381/86 |
| 6,324,294 B1 * | 11/2001 | Azima et al. | 381/381 |
| 6,546,106 B1 | 4/2003 | Azima | |
| 6,760,461 B1 * | 7/2004 | Azima et al. | 381/389 |
| 6,845,166 B1 | 1/2005 | Hara et al. | |
| 2001/0009586 A1 | 7/2001 | Suzuki | |
| 2001/0048256 A1 | 12/2001 | Miyazaki et al. | |
| 2002/0191808 A1 | 12/2002 | Croft, III et al. | |
| 2004/0022408 A1 * | 2/2004 | Mango et al. | 381/408 |
| 2004/0022409 A1 * | 2/2004 | Hutt et al. | 381/423 |

OTHER PUBLICATIONS

"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

EDM Charmilles; A Practical Guide to Electro-Discharge Machining; Ateliers des Charmilles S.A. (p. 12-13).

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5.. May 2004.

Five (5) pages of photographs of loudspeaker with mounting apparatus, undated.

Two (2) pages of photographs of bracket, undated.

* cited by examiner

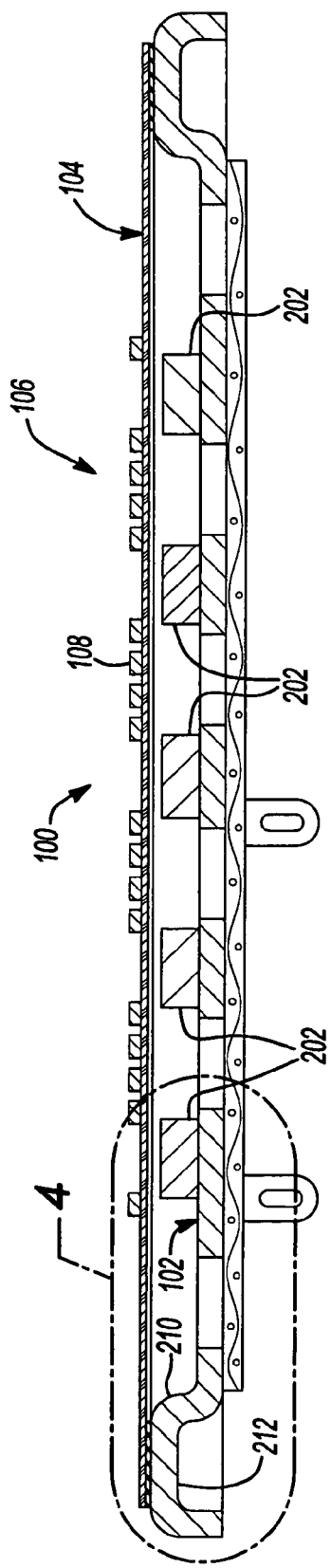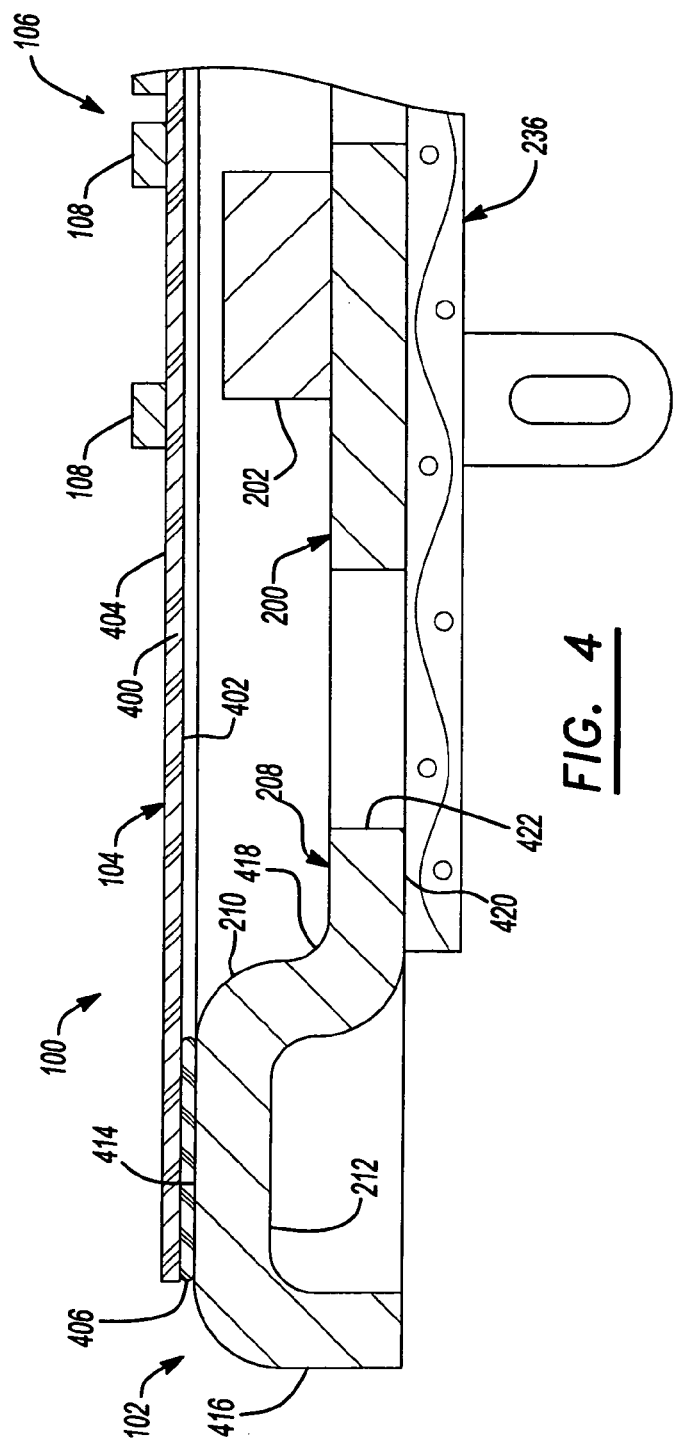

ELECTRO-DYNAMIC LOUDSPEAKER MOUNTING SYSTEM

CROSS-REFERENCE TO RELATED APPLICATIONS

This application claims the benefit of U.S. Provisional Application No. 60/380,001, filed on May 2, 2002; U.S. Provisional Application No. 60/378,188, filed on May 6, 2002; and U.S. Provisional Application No. 60/391,134, filed on Jun. 24, 2002. The disclosures of these patent applications are incorporated by reference.

This application incorporates by reference the disclosures of each of the following co-pending applications which have been filed concurrently with this application: U.S. patent application Ser. No. 10/428,313, entitled "Mounting Bracket System," filed May 2, 2003; U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/429,228, entitled "Electrical Connectors For Electro-Dynamic Loudspeakers," filed May 2, 2003; U.S. patent application Ser. No. 10/429,173, entitled "Conductors For Electro-Dynamic Loudspeakers," filed May 2, 2003; U.S. patent application Ser. No. 10/354,974, entitled "Frame Structure," filed May 2, 2003; U.S. patent application Ser. No. 10/429,289, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; U.S. patent application Ser. No. 10/429,243, entitled "Frequency Response Enhancements For Electro-Dynamic Loudspeakers," filed May 2, 2003; and U.S. patent application Ser. No. 10/429,163, entitled "Magnet Arrangement For Loudspeaker," filed May 2, 2003.

BACKGROUND OF THE INVENTION

1. Field of Invention

The invention relates to mounting apparatus like brackets or hardware for mounting components and/or subassemblies at a variety of locations in a vehicle, such as an automobile. In particular, the invention relates to mounting brackets for mounting an electro-dynamic planar loudspeaker in a vehicle. The mounting bracket of the invention provides for a simple and economical installation of the loudspeaker.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

It is, therefore, desirable to provide a mounting apparatus that enables an electro-dynamic loudspeaker to be located and secured in a variety of mounting locations in an automobile or other vehicle.

SUMMARY

The mounting apparatus of the invention attaches a device or component like an electro-dynamic loudspeaker to a mounting location in an automobile or other vehicle. The mounting apparatus may employ bracket hardware that is either affixed to or integral with the loudspeaker that is to be mounted. In addition, the mounting apparatus may position the loudspeaker in a fixed orientation, or enable the orientation of the loudspeaker to be variable, as desired, to achieve the optimum performance of the loudspeaker.

The mounting apparatus may comprise a mounting bracket of a unitary construction into which an electro-dynamic loudspeaker may be "snap-fit" or otherwise attached. This mounting bracket positions the loudspeaker generally parallel with the mounting surface in a fixed orientation. Alternatively, features of such a mounting bracket may be integrally incorporated into the structure of a grille for an electro-dynamic loudspeaker for mounting the loudspeaker at a mounting location. In still another alternative, a mounting bracket is disclosed to position the loudspeaker in a fixed angular orientation not generally parallel with the mounting surface.

The mounting bracket may also be adapted to provide for variable adjustment to the angular orientation of the loudspeaker contemporary with, or subsequent to, the mounting of the loudspeaker. In one alternative, a mounting bracket into which the loudspeaker is affixed can be adjusted to control the angle of the loudspeaker relative to the mounting location by means of a slide adjustment. The mounting bracket of this embodiment may be of unitary construction and incorporate "living hinges" about which the angle of the loudspeaker can vary. In another alternative, a ball-and-socket-type arrangement between the loudspeaker and a mounting bracket allows the loudspeaker to be angularly adjusted, as desired, relative to the mounting location.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a cross-sectional view of the electro-dynamic loudspeaker taken along line 3—3 of FIG. 1.

FIG. 4 is an enlarged cross-sectional view of the encircled area of FIG. 3.

DETAILED DESCRIPTION

An electro-dynamic planar loudspeaker 100 may be mounted in a vehicle, for example, an automobile, by the mounting brackets. The mounting apparatus may be adapted to mount and secure any of a variety of components or sub-assemblies in any of a variety of desired locations in the vehicle.

Figure 1:
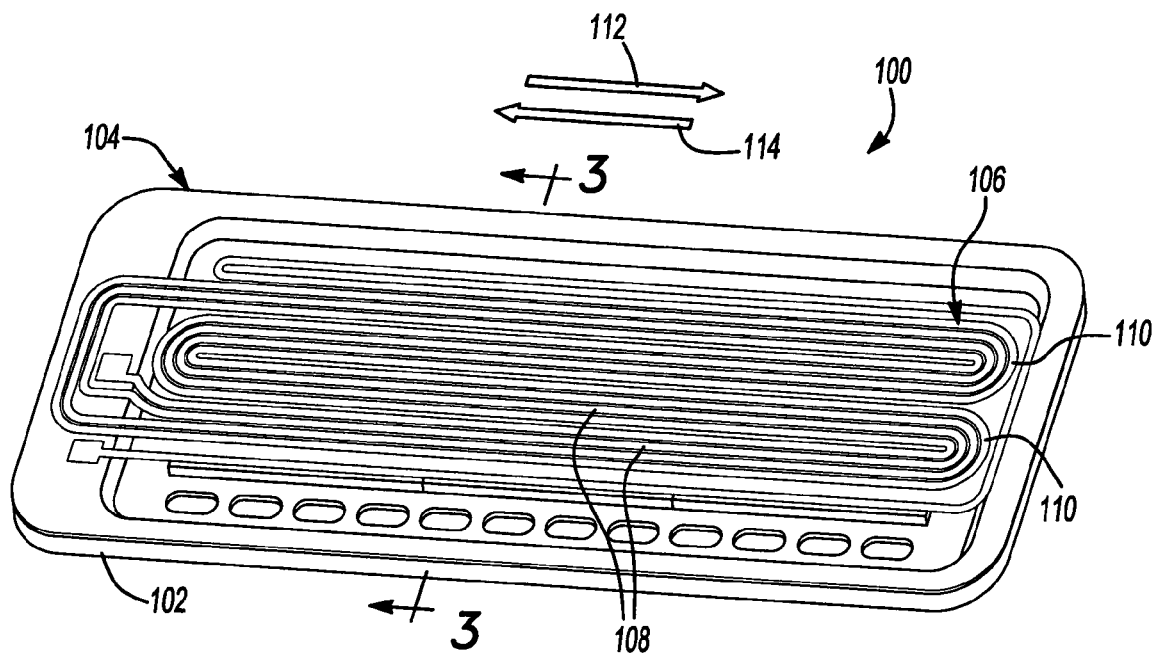
FIG. 1 is a perspective view of a electro-dynamic loudspeaker as it would appear with the grille removed.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
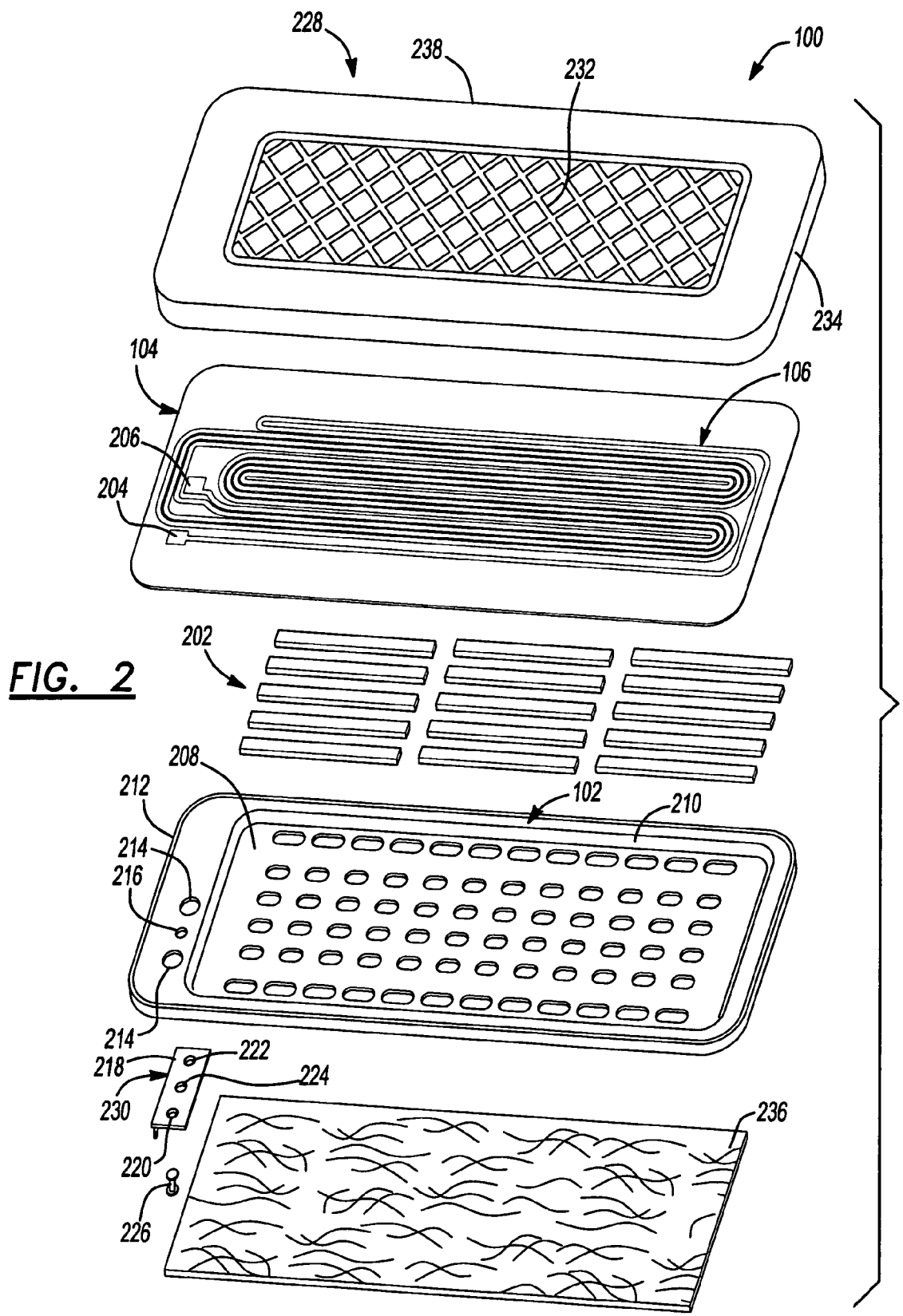
FIG. 2 is an exploded perspective view of the electro-dynamic loudspeaker shown in FIG. 1 having a grille.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame 102 in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately .001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Figure 5:
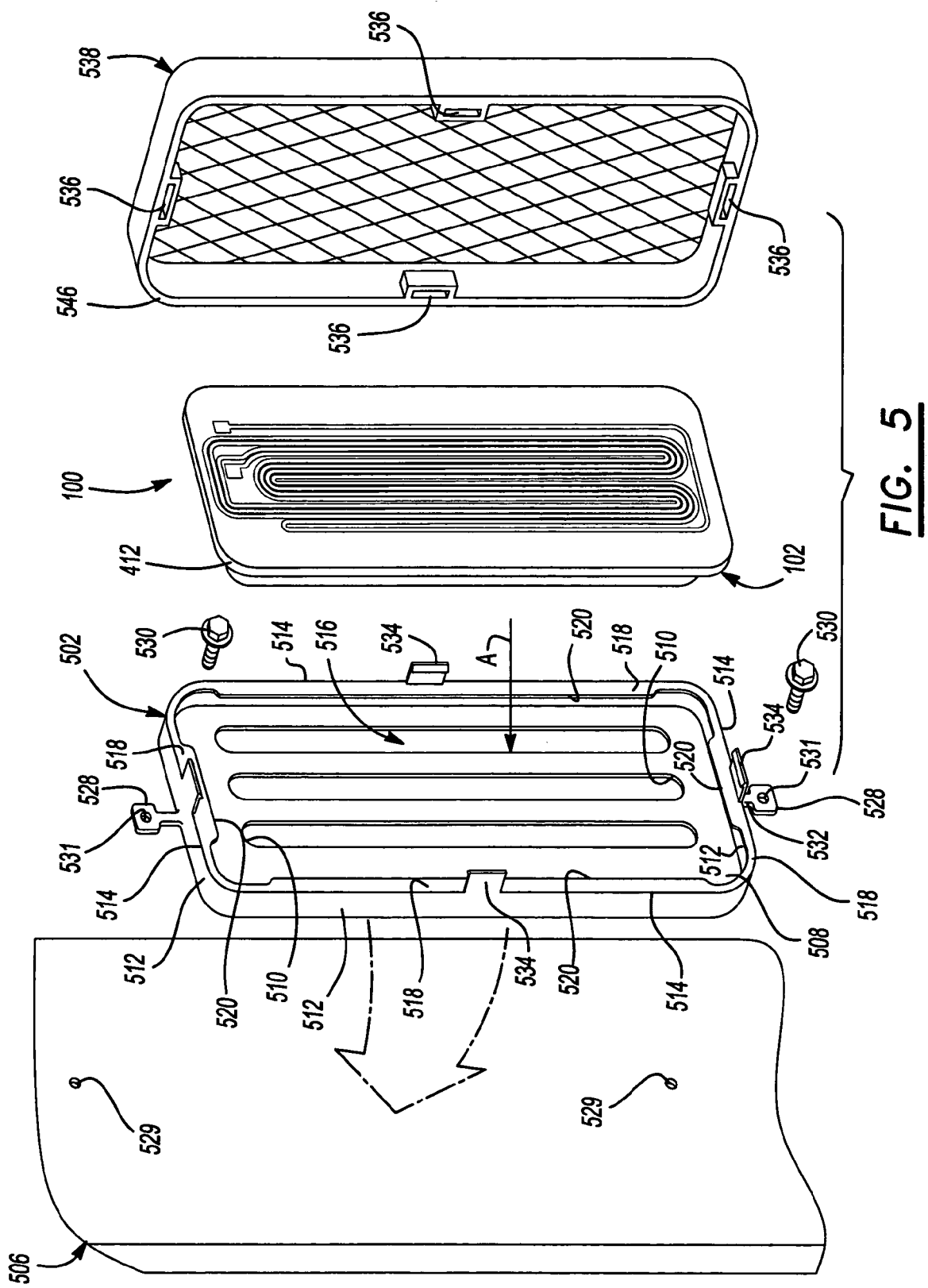
FIG. 5 is an exploded three-quarter side perspective view illustrating a mounting bracket used for the installation of an electro-dynamic loudspeaker at a mounting location.

One embodiment of the mounting apparatus of the invention that is utilized for the installation of an electro-dynamic loudspeaker 100 is illustrated in FIG. 5. The mounting apparatus 500 may comprise a mounting bracket 502 of unitary construction. The mounting bracket 502 is shown for use in installing a loudspeaker 100 on a mounting surface or location 506, such as a structural pillar, for example, in an automobile or other vehicle.

The mounting bracket 502 is shown to include a generally planar, back panel section 508. Optionally, a plurality of apertures 510 may be included in the back panel section 508 to, for example, reduce the cost and/or weight of the mounting bracket 502 or provide air passageways through the mounting bracket 502, as necessary.

A sidewall 512 extends generally orthogonally from the back panel section 508 so as to define the outer boundary and periphery 514 and the interior space 516 of the mounting bracket 502. Extending inwardly from the periphery 514 of the sidewall 512 and toward the interior space 516 of the mounting bracket 502, is a flange or rib 518. The rib 518 generally lies in a plane that is parallel to and offset from the back panel section 508, thereby establishing the thickness of the mounting bracket 502. Portions 520 of the rib 518 may extend still further inwardly from the sidewall 512.

Located at opposite ends of the mounting bracket 502 are flanges 528 having apertures 529. Flanges 528 provide a location at which the mounting bracket 502 may be secured to the mounting location 506, such as via a threaded fastener 530 and apertures 529 and 531 or as otherwise well-known or disclosed herein. Flanges 528 may each further include a neck portion 532 that allows the position and/or orientation of the flange 528 to manipulated, such as by bending or twisting, to better conform the flange 528 to the surface at the mounting location 506. Of course, the number and location of the flange(s) 528 may be determined by the requirements of the mounting application, such as the size, shape and weight of, and the operating conditions seen by, the device that is to be mounted or the space available at the mounting location 506.

Also integrally included as part of the mounting bracket 502 are a plurality of male projections 534 extending outwardly from the rib 518 of the mounting bracket 502. Each of the projections 534 forms one-half of a two-piece "snap-fit"-type fastener. The projections 534 may be included for interlocking with corresponding female receptacles 536 that are part of a finish trim piece 538, like a bezel, cover or grille, so that the finish trim piece 538 may be easily connected directly to the mounting bracket 502 to complete a component's installation. Any of a variety of suitable interlocking connections may be included in the mounting bracket 502 and trim piece 538.

The mounting bracket 502 is shown in FIG. 5 to be generally rectangular in shape. The mounting bracket 502 may, of course, be of any shape, size and configuration that is suitable to accommodate the particular device that is to be mounted.

Assembly of the loudspeaker 100 with the mounting bracket 502 is accomplished by installing the loudspeaker 100 from the front side of the mounting bracket 502 (in the direction of arrow A). The loudspeaker 100 is "snap-fit" into the mounting bracket 502. The loudspeaker 100 is retained within the interior space 516 of the mounting bracket 502 between the back panel section 508 and the inwardly extending rib portions 520 that overlay a peripheral portion of the flange 412 on the loudspeaker's 100 frame 102. In this configuration, the depth of the interior space 516 of the mounting bracket 502 closely matches the overall thickness of the loudspeaker 100 so that the mounting bracket 502 adequately retains the loudspeaker 100. Optionally, the loudspeaker 100 may be attached directly to the back panel section 508 of the mounting bracket 502, such as through the use of an adhesive. Also, a hook and loop fastener, like Velcro®, that is adhered by an adhesive to the back panel section 508 and the back of the loudspeaker 100, may be employed. Such an arrangement may be employed in addition to, or in lieu of, ribs 518.

A trim piece 538, in this case, for example, a speaker grille, may then be attached to the mounting bracket 502. The grille 538 is secured to the mounting bracket 502 by the interlocking of the female receptacles 536 located about its periphery 546 with the corresponding male projections 534 extending outwardly from the rib 518 of the mounting bracket 502. Thus, the mounting bracket 502 facilitates the finished installation of the loudspeaker 504 with an aesthetically pleasing appearance.

Installation of the loudspeaker 100 via the mounting bracket 502 is accomplished by assembling the loudspeaker 100 with the mounting bracket 502, and installing the assembly at the mounting location 506 with fasteners 530. Preferably, the loudspeaker 100 is attached to the mounting bracket 502 prior to installing the mounting bracket 502 at the mounting location 506. Alternatively, however, the mounting bracket 502 may first be installed at the mounting location 506, and the loudspeaker 100 subsequently be assembled with the mounting bracket 502.

Figure 6:
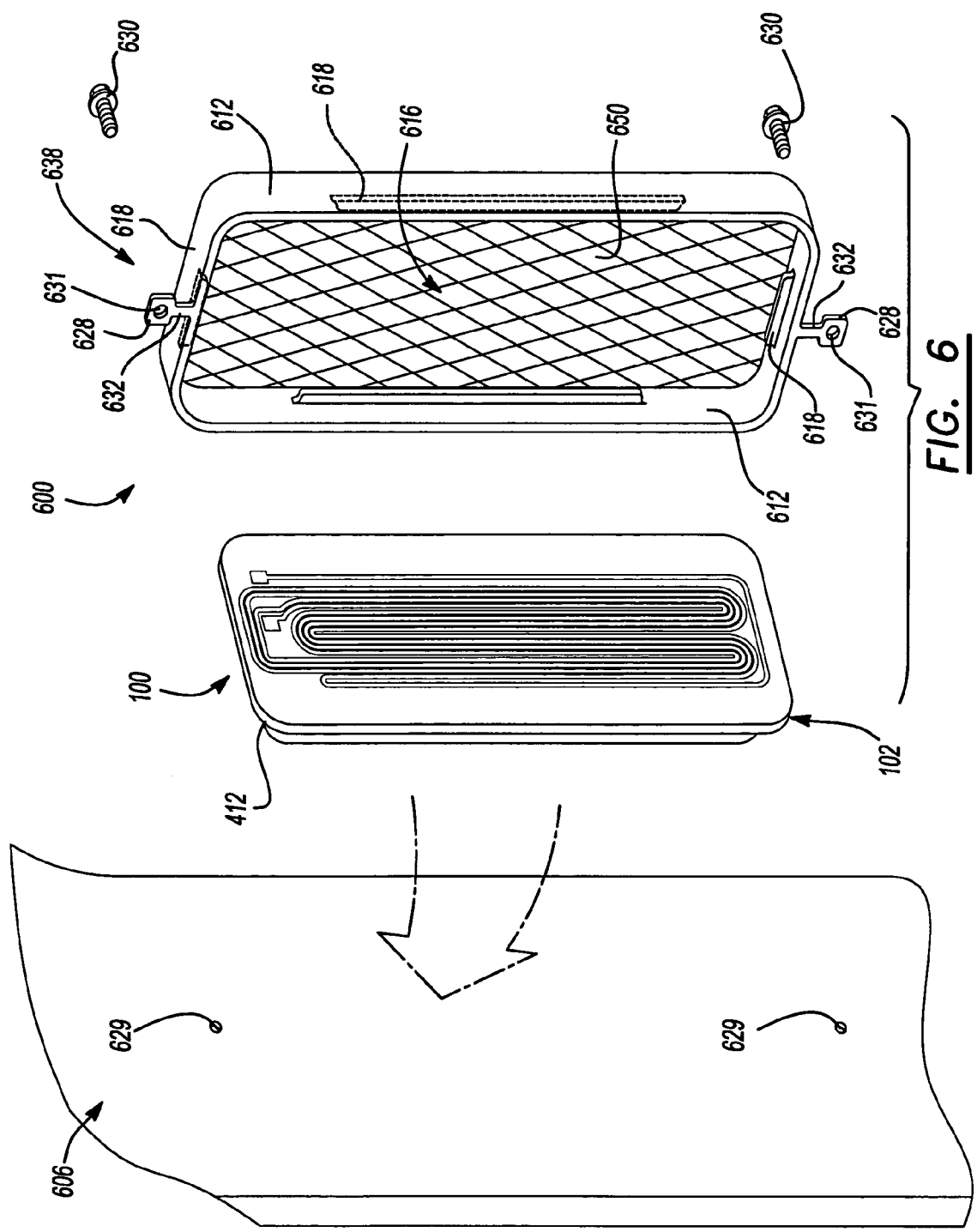
FIG. 6 is an exploded three-quarter side perspective view illustrating a mounting bracket as incorporated into the structure of a grille for an electro-dynamic loudspeaker for mounting the component at a mounting location.

FIG. 6 shows another embodiment of a mounting apparatus 600 of the invention. Here, it is the finish trim piece or grille 638 (and not a separate mounting bracket) that incorporates features to enable the loudspeaker 100 to be mounted while minimizing the number of components in the mounting apparatus 600. As illustrated, the grille 638 includes one or more flange(s) 628 that allow the grille 638 to be directly attached at the mounting location 606.

Included in two or more sidewalls 612 of the grille 638, at locations intermediate the opposite ends of the sidewalls 612, are elongated flanges or ribs 618 that project inward toward the interior space 616 of the grille 638. The configuration of the elongated ribs 618 enable the loudspeaker 100 to be retained within the interior space 616 of the grille 638 about the peripheral portion of the loudspeaker 100 frame 102 (e.g., flange 412) between the ribs 618 and the front face 650 of the grille 638. The grille 638 may then be secured at the mounting location 606 at flange(s) 628 by means of threaded fasteners 630 in cooperation with apertures 629 in the mounting location 606 and apertures 631 of grille 638. Again, elimination of a separate mounting bracket component is achieved, thereby enabling a simpler, faster, and more economical installation of the loudspeaker 100.

Referring to the mounting apparatus 500, 600 shown in FIGS. 5 and 6, the mounting location 506, 606 is illustrated as being a surface of a generally planar configuration. The mounting location 606 may comprise, for example, a structural pillar or other space-claim in an automobile or other vehicle. Apertures 529, 629 are included in the mounting location 506, 606 and cooperate with the threaded fasteners 530, 630 to mount the loudspeaker 100. Accordingly, the apertures 529, 629 are positioned in the mounting location 506, 606 to ensure that the loudspeaker 100 is accurately located at its desired position in the vehicle.

The mounting apparatus 500, 600 may be constructed of any suitable material that possesses the strength to ensure that, upon installation, the component is securely fixed at the mounting location and will continue to maintain a secure mount and withstand the operating conditions experienced by the loudspeaker 100 in the vehicle.

One contemplated method of manufacture for the mounting bracket 502 and grille 538, 638 is to be molded in one piece from plastic, such as by plastic injection molding or otherwise. There are a variety of suitable, low-cost plastic materials that may be utilized for such an application that possess both the required structural characteristics as well as the additional desirable features like light weight.

Figure 7:
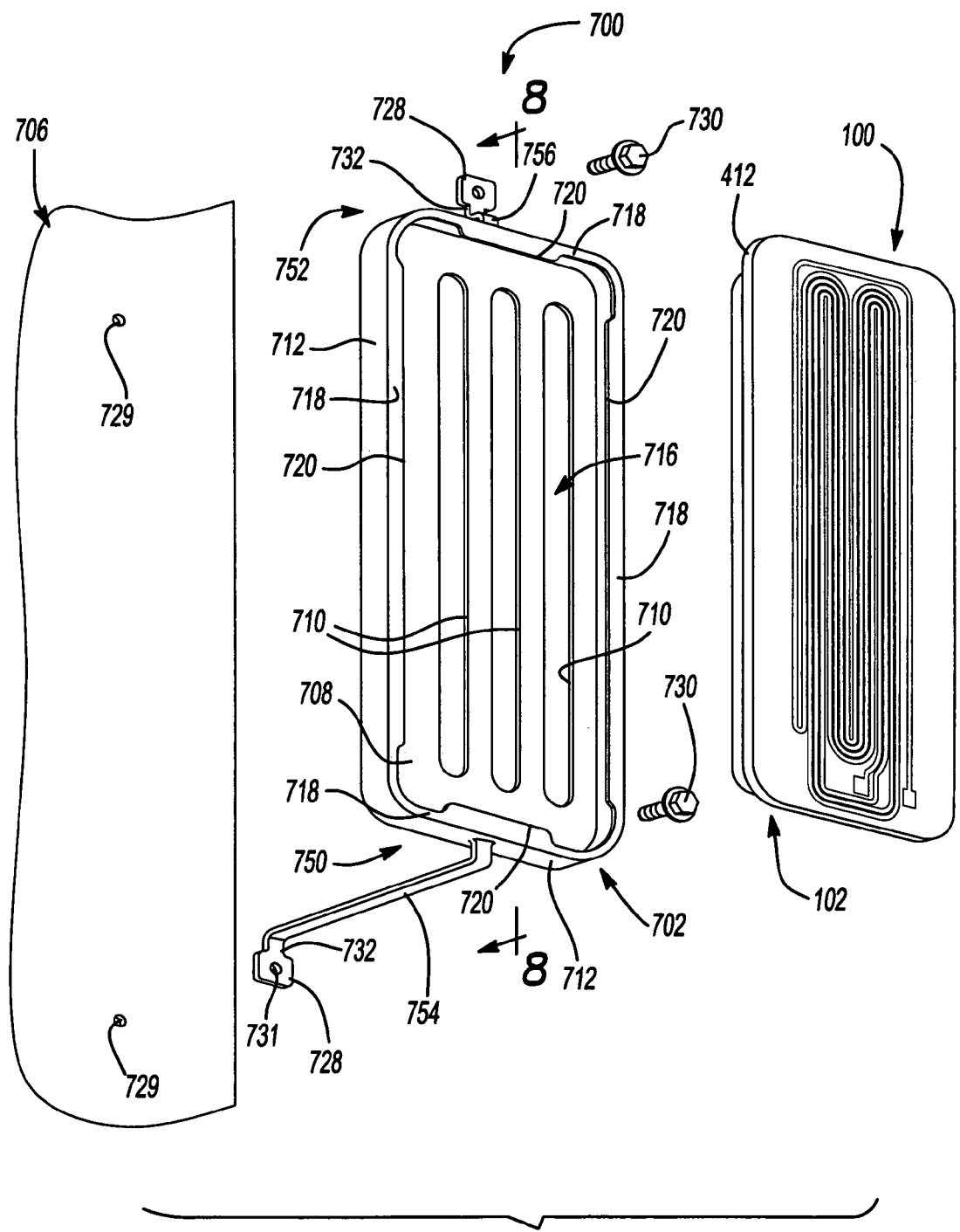
FIG. 7 is an exploded three-quarter perspective view showing a mounting bracket for mounting an electro-dynamic loudspeaker in a fixed angular (non-parallel) orientation of the loudspeaker relative to a mounting location.
Figures 8, 11:
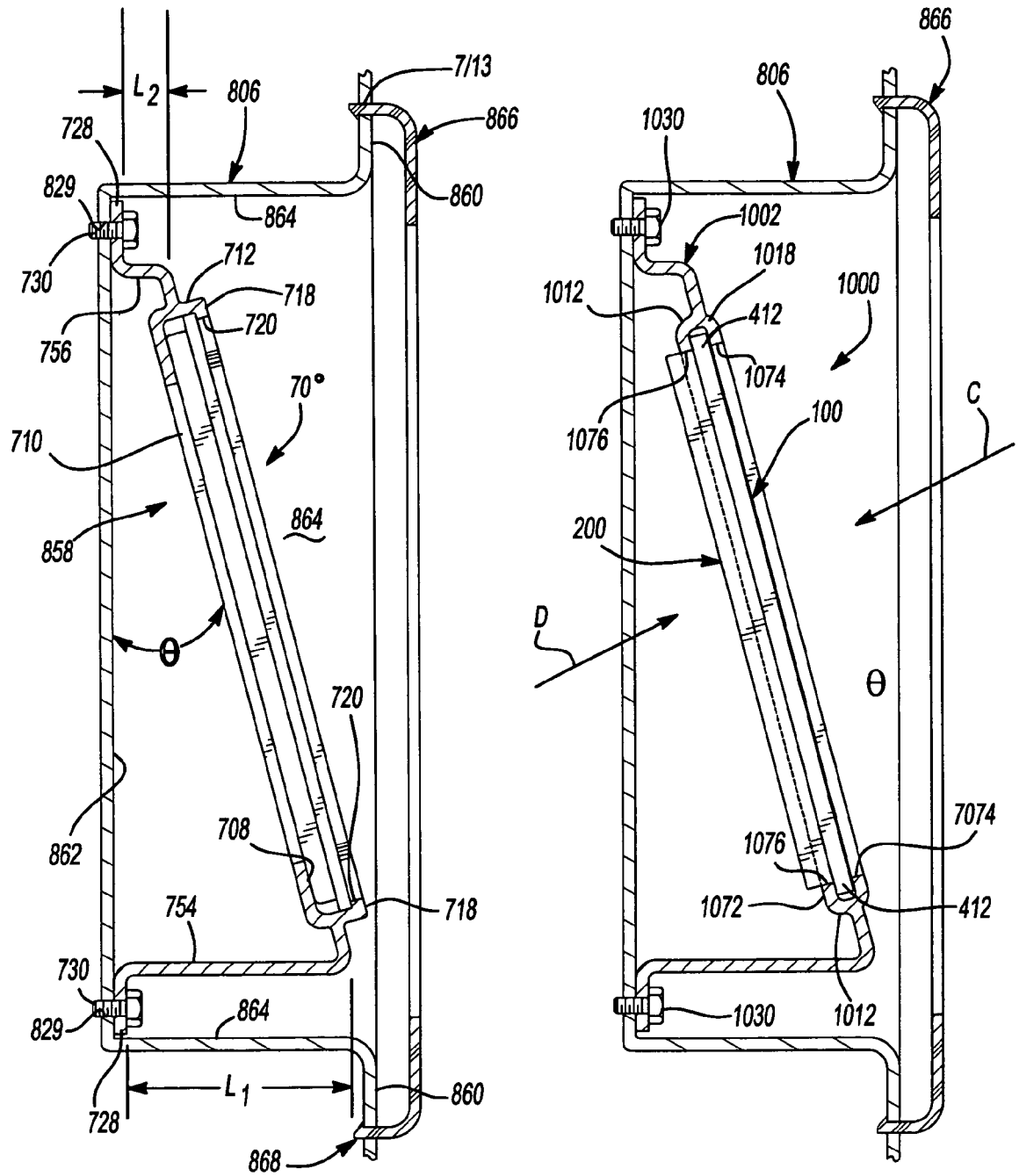
FIG. 8 is a cross-sectional side view taken along the line 8—8 of FIG. 7.
FIG. 11 is a cross-sectional side view taken along the line 11—11 of FIG. 10.

Another embodiment of the invention is illustrated in FIGS. 7 and 8. FIGS. 7 and 8 show a mounting apparatus 700 for installing an electro-dynamic loudspeaker 100 in a fixed, non-parallel orientation relative to a mounting location 706. The mounting apparatus 700 is operable to mount and orient the loudspeaker 100 at the mounting location 706 at a desired or predetermined fixed angle θ relative to the mounting location, such as may be necessary or preferred to achieve the optimum performance of the loudspeaker 100 in a listening environment.

The mounting apparatus 700 comprises a mounting bracket 702 that shares many structural features similar to that of the mounting bracket 502 (shown in FIG. 5 and discussed above). In this regard, then, the like features of the mounting brackets 502 and 702 are labeled with corresponding reference numerals.

Located at opposite ends 750, 752 of the mounting bracket 702 are a first leg 754 and a second leg 756, respectively. The legs 754, 756 each generally extend from the mounting bracket 702 in a direction toward the mounting location 706. The legs 754, 756 each terminate at flanges 728 that enable the mounting bracket 702 to be secured to the mounting location 706. The flanges 728 each have an aperture 731 that is operable to receive any suitable fastening device, such as threaded fastener 730, to secure the mounting bracket 702 to the mounting location 706.

As best illustrated in FIG. 8, first leg 754 has a length $L_1$ and second leg 756 has a length $L_2$. Length $L_1$ and Length $L_2$ are different from one another, with the first leg 754 (length $L_1$) being longer than the second leg 756 (length $L_2$). Consequently, when the mounting bracket 702 is attached at the mounting location 706, the loudspeaker 100 is oriented at an angle $\theta$ relative to the mounting location 706. By changing the relative lengths $L_1$ and $L_2$ of the first and second legs 754, 756, then, the loudspeaker 100, assembled with the mounting bracket 702, may be positioned at any desired angle $\theta$ relative to the mounting location 706. In general, the angle $\theta$ would most likely be between about 0° to about 45°.

Orienting the loudspeaker at a particular angle $\theta$ may be important or necessary to achieve the desired audio effect or performance in the listening environment. Of course, if it is desired that the loudspeaker 100 not be angled relative to the mounting location 706 (e.g., the loudspeaker 100 is parallel with the mounting location 706), then the first and second legs 754, 756 may be of equal length, i.e., $L_1$ and $L_2$ are equal.

Assembly of the loudspeaker 100 with the mounting bracket 702 is accomplished from the front side of the mounting bracket 702, as described above with reference to mounting apparatus 500. The loudspeaker 100/mounting bracket 702 assembly may then be secured at the mounting location 706 via fasteners 730. The fasteners 730 pass through apertures 731 in flanges 728 and are attached at the mounting location in apertures 729. Of course, other suitable fastening or attachment methods may also be employed to secure the mounting bracket 702 to the mounting location 706.

As shown in FIG. 8, the mounting apparatus 700 is particularly suited for and may be employed where the mounting location 806 comprises a cavity 858 of a suitable shape and size to receive mounting bracket 702 and loudspeaker 100, as assembled.

Mounting location 806 includes an exterior mounting surface 860, an interior mounting surface 862, and a plurality of interior sidewalls 864 which span the distance between the interior mounting surface 862 and the exterior mounting surface 860. The exterior mounting surface 860, interior mounting surface 862 and interior sidewalls 864 combine to create a cavity 858 that serves as the space claim for the loudspeaker 100 and mounting apparatus 700, i.e., the three-dimensional location which may be occupied by the loudspeaker 100 and mounting apparatus 700.

The mounting location 806 may be, for example, in the interior passenger compartment of an automobile or other vehicle. In this regard, the mounting location may be part of a door panel, headliner, seating unit, overhead or floor console, structural pillar, interior trim panel, dashboard, instrument cluster, or the like. Consequently, the depth of the cavity 858 (e.g., the length of the interior sidewalls 864) may be as small as between one and two inches (25 mm–50 mm).

Figure 17:
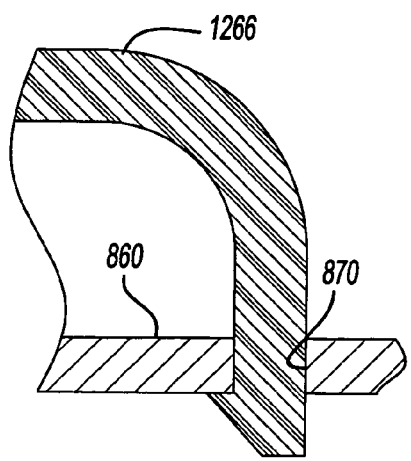
FIG. 17 is an enlarged detail cross-sectional view taken along the line 17—17 of FIG. 12 showing the attachment of a grille for the loudspeaker at the mounting location.

To provide a protective cover for the loudspeaker 100 and to create an aesthetically pleasing appearance at the mounting location 806, a trim piece 866 may be attached to the exterior mounting surface 860 of the mounting location 806. As shown in FIG. 8, the trim piece 866 may comprise, for example, a speaker grille. The grille 866 may be secured to the exterior mounting surface 860 by any of a variety of methods, including those previously discussed herein. FIGS. 8 and 17 illustrate a "snap-fit" connection for the grille 866 to the exterior mounting surface 860. A plurality of male projections 868 on the grille 866 interlock with a corresponding number of female receptacles or slots 870 that are located in the exterior mounting surface 860. The plurality of male projections 868 and female receptacles 870 are positioned about the periphery of the grille 866 and the cavity 858, respectively.

Figure 9:
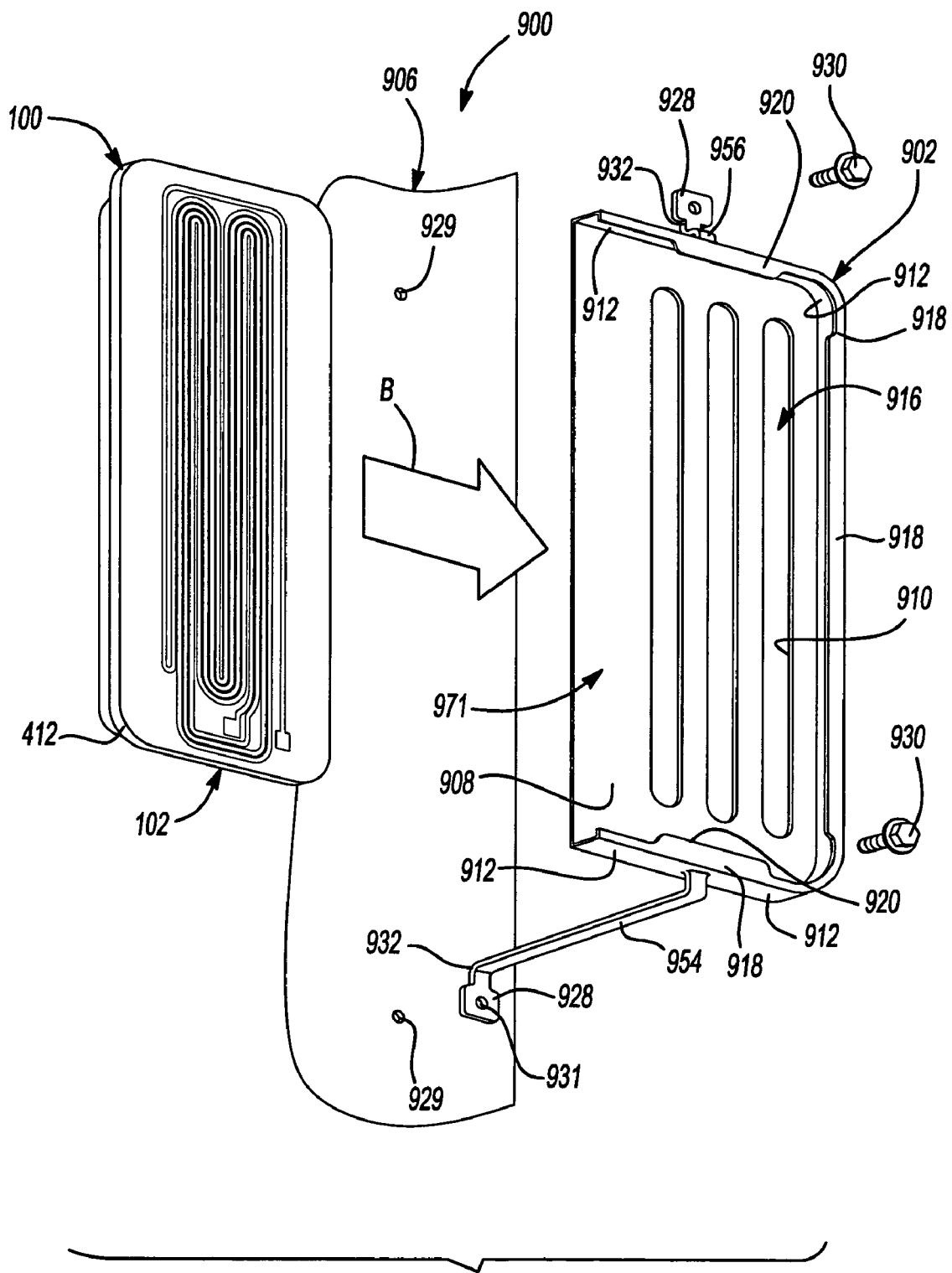
FIG. 9 is an exploded three-quarter perspective view showing a mounting bracket used for the installation of an electro-dynamic loudspeaker at a mounting location in a fixed angular (non-parallel) orientation of the loudspeaker relative to a mounting location.

Still another embodiment of the invention is illustrated in FIG. 9. The mounting apparatus 900 shown in FIG. 9 comprises a mounting bracket 902 that is similar to that shown in FIG. 7 and 8 and, therefore, like features of the mounting bracket 902 are labeled with corresponding reference numerals.

The difference between the mounting bracket 902 and the mounting bracket 702, discussed above, is that the mounting apparatus enables the loudspeaker to be assembled with the mounting bracket 902 from the side of the mounting bracket 902 via a "slide-fit" assembly. In this regard, the sidewall 912 extends from the back panel section 908 from only three sides of the mounting bracket 902. Consequently, the mounting bracket 902 is left with an open end 971.

Assembly of the loudspeaker 100 with the mounting bracket 902, then, simply requires that the loudspeaker 100 be slid into the interior space 916 in the direction of arrow B. The loudspeaker 100 is retained within the interior space 916 of the mounting bracket 902 between the back panel section 908 and the inwardly extending ribs 918 and rib portions 920 that overlay a peripheral portion of the flange 412 on the loudspeaker's 100 frame 102.

Figure 10:
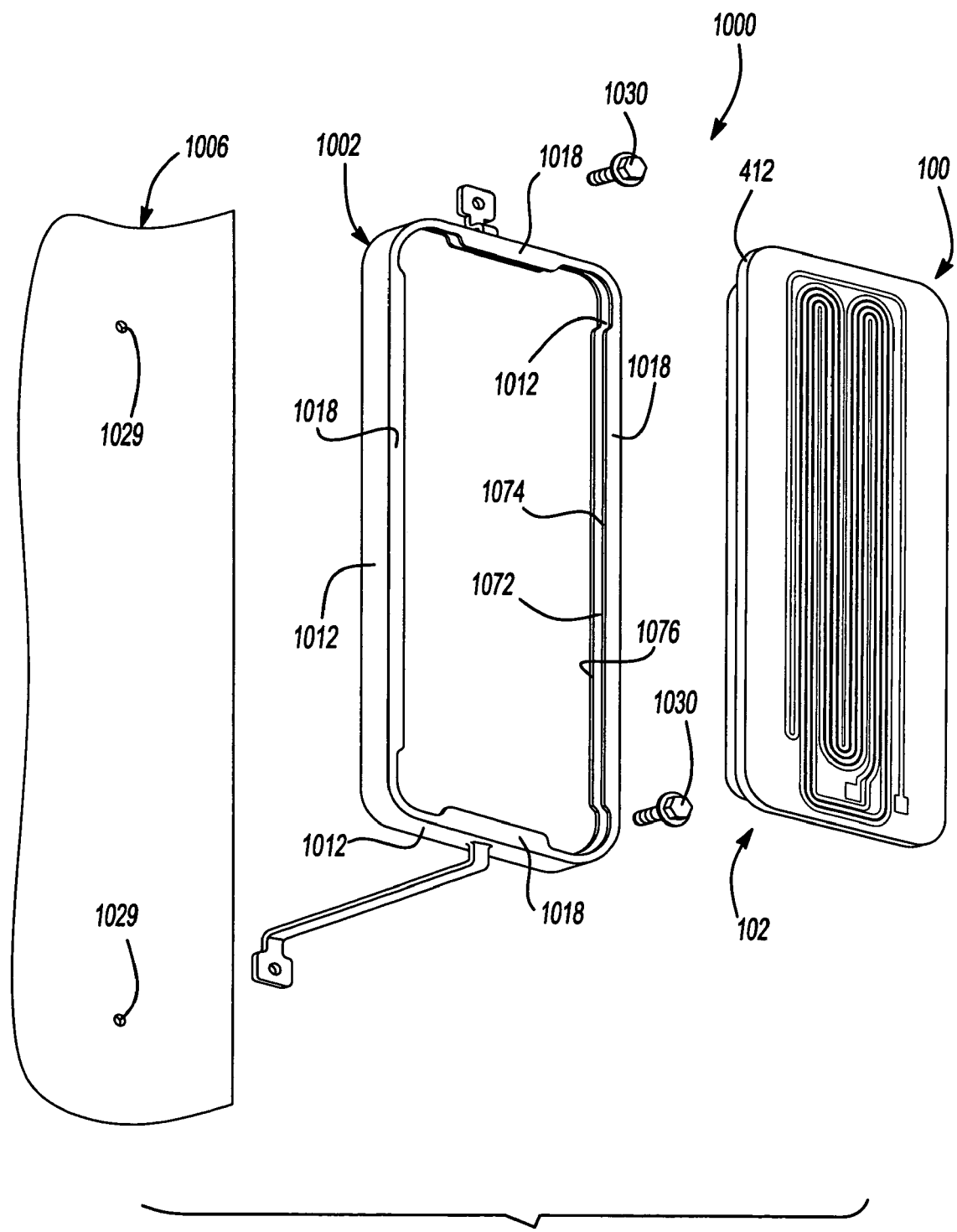
FIG. 10 is an exploded three-quarter perspective view showing a mounting bracket for installing an electro-dynamic loudspeaker at a mounting location in a fixed angular (non-parallel) orientation relative to a mounting location.

FIGS. 10 and 11 illustrate yet an additional embodiment of a mounting apparatus 1000 of the invention. Mounting apparatus 1000 is also similar to the mounting apparatus 700 illustrated in FIGS. 7 and 8. As before, like reference numbers in the FIGs. identify like features and/or characteristics of the mounting apparatus.

Mounting apparatus 1000 enables the loudspeaker 100 to be assembled with the mounting bracket 1002 from either the front side or the back side of the mounting bracket 1002, as indicated by arrows C and D in FIG. 11. As shown, mounting bracket 1002 eliminates the back panel section that was included in the other mounting brackets 502, 702, 902, discussed above. Instead, the mounting bracket 1002 includes additional ribs 1072 inwardly extending from the sidewall 1012 and which are offset from the ribs 1018. Ribs 1018 and 1072 are generally parallel to one another and separated by a distance that is approximately equal to the thickness of the flange 412 on the frame 102 of the loudspeaker 100.

Together, ribs 1018 and 1072 form apertures 1074, 1076, respectively, in the mounting bracket 1002 through which the loudspeaker 100 may be passed for "snap-fit" assembly with the mounting bracket 1002. Similar to the assembly method that is discussed above, the loudspeaker 100 is retained in the mounting bracket 1002 by the inwardly extending ribs 1018, 1072 that overlay a peripheral portion of the flange 412 on the loudspeaker's 100 frame 102. In this embodiment, however, the mounting bracket 1002 only retains flange 412 on the loudspeaker's 100 frame 102, while the remainder of the frame 102 is exposed at the back side of the mounting bracket 1002.

Still a further embodiment of the invention is illustrated in FIGS. 12 through 20 in mounting apparatus 1200. Mounting apparatus 1200 is operable for mounting an electro-dynamic loudspeaker 100 and provides for an adjustably variable angular orientation of the loudspeaker relative to the mounting location 806. As best illustrated in FIGS. 12, 13, 14 and 16, the mounting apparatus 1200 generally includes a mounting bracket 1402, a trim cover or grille 1266, and a guide bracket or slide 1600.

Figure 12:
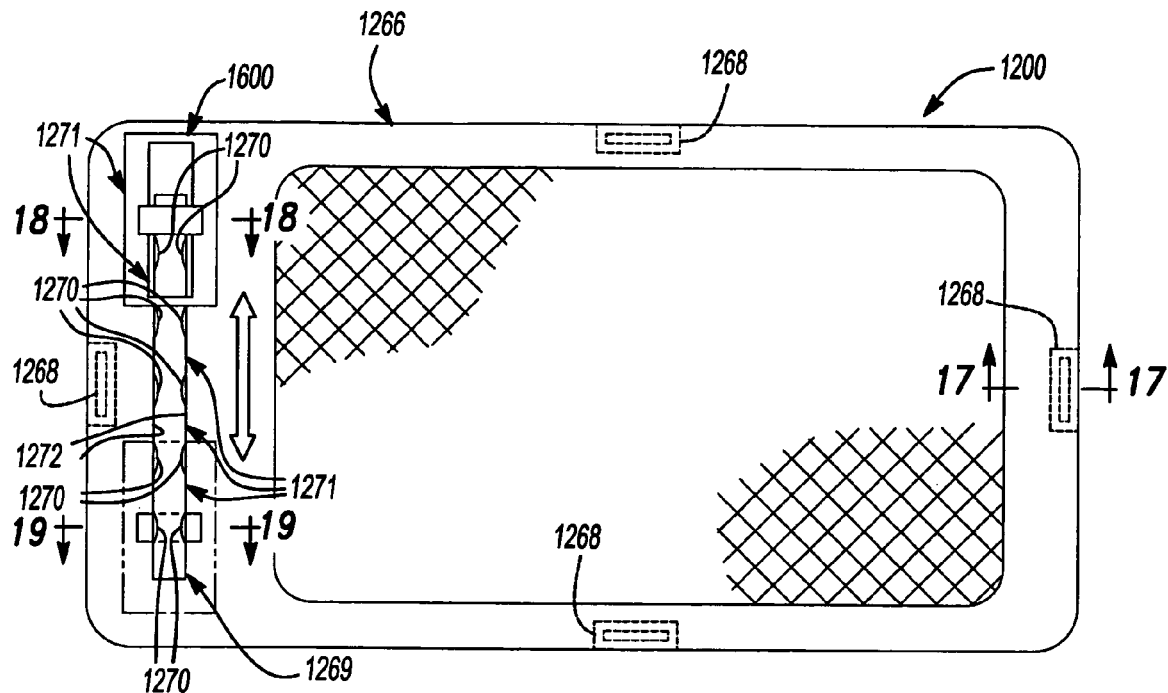
FIG. 12 is a front view of an installation for mounting an electro-dynamic loudspeaker in a variable angular orientation and allowing for adjustment of the loudspeaker relative to a fixed mounting location.
Figure 13:
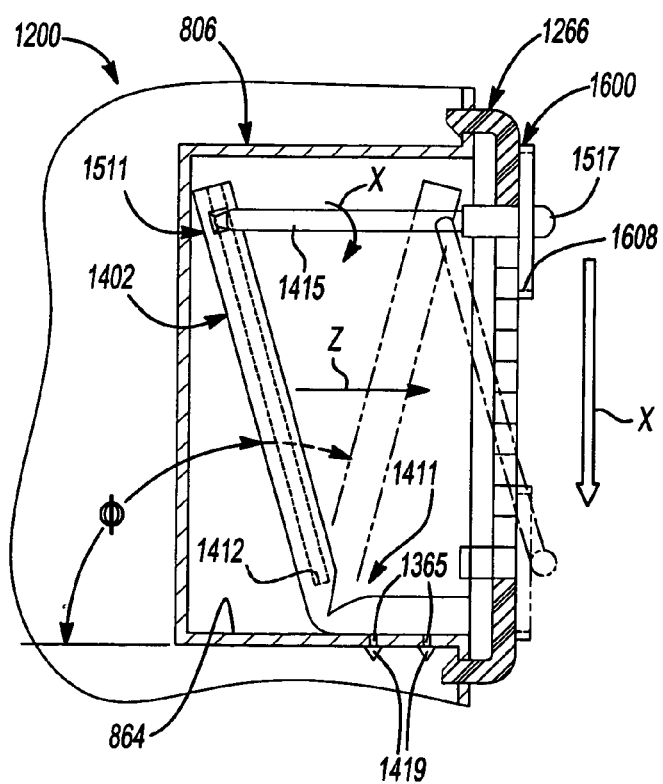
FIG. 13 is a cross-sectional side view of the installation of FIG. 12.
Figure 14:
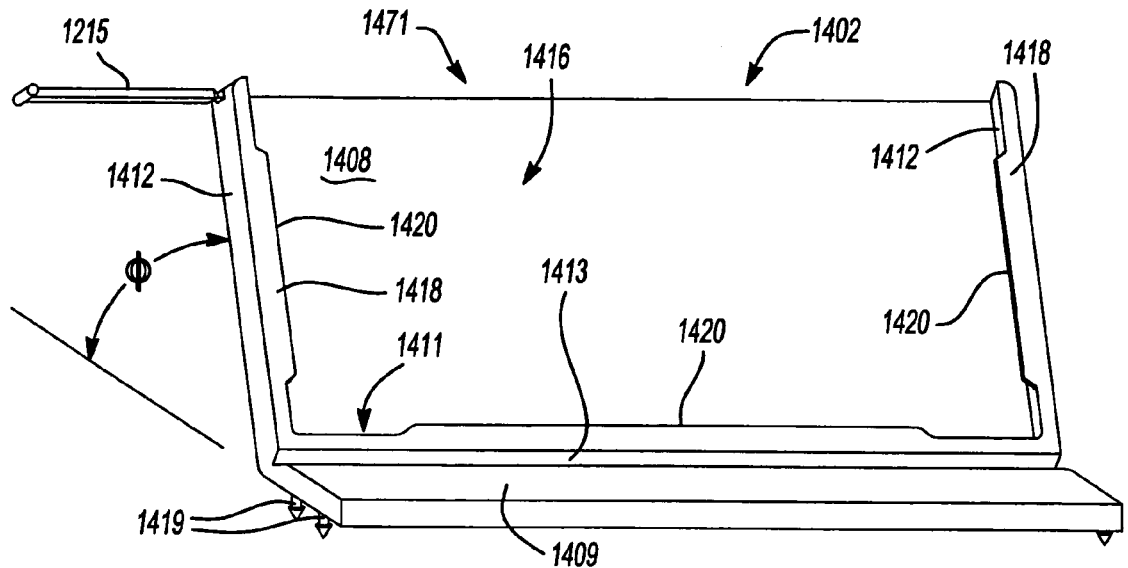
FIG. 14 is a three quarter front perspective view showing a mounting bracket used with the installation shown in FIG. 12.

FIG. 14 shows a mounting bracket 1402 for use with the mounting apparatus 1200. Mounting bracket 1402 includes a generally planar first panel section 1408 that is coupled to a lower support portion or second panel section 1409 by way of a "living" hinge 1411. The hinge 1411 comprises a V-shaped groove 1413 integrally formed in the mounting bracket 1402 between the first panel section 1408 and the second panel section 1409. The hinge 1411 enables the first panel section 1408 and the second panel section 1409 to pivot relative to one another over an angle φ. As shown in FIGS. 12 and 13, the angle (p may have a maximum value between about 120° and about 145°. Of course, the hinge 1411 may be designed to accommodate any desired angular range for relative orientation of the first panel section 1408 and second panel section 1409.

A sidewall 1412 extends generally orthogonally from three sides of the first panel section 1408 of the mounting bracket 1402 to define the an outer boundary and interior space 1416 of the first panel section. Optionally, a plurality of apertures (such as those shown in FIGS. 5 and 7) may be included in the first panel section 1408 to, for example, reduce the cost and/or weight of the mounting bracket 1402 or to provide air passageways through the mounting bracket 1402, as necessary.

Extending inwardly from the sidewall 1412 and toward the interior space 1416 of the mounting bracket 1402, is a flange or rib 1418. The rib 1418 generally lies in a plane that is parallel to and offset from the first panel section 1408 for a distance that is approximately the same as the thickness of the loudspeaker. Portions 1420 of the rib 1418 extend still further inwardly from the sidewall 1412.

Similar to that discussed above in connection with the embodiment of the invention shown in FIG. 9, because the sidewall 1412 of the first panel section 1408 extends from only three sides of the first panel section 1408, the mounting bracket 1402 includes an open end 1471. As such, the open end 1471 enables the mounting bracket 1402 to receive a loudspeaker 100 in the interior space 1416 by way of a "slide-fit" assembly. The loudspeaker 100 is preferably attached to the mounting bracket 1402 prior to installing the mounting bracket 1402 at the mounting location 806.

Figure 15:
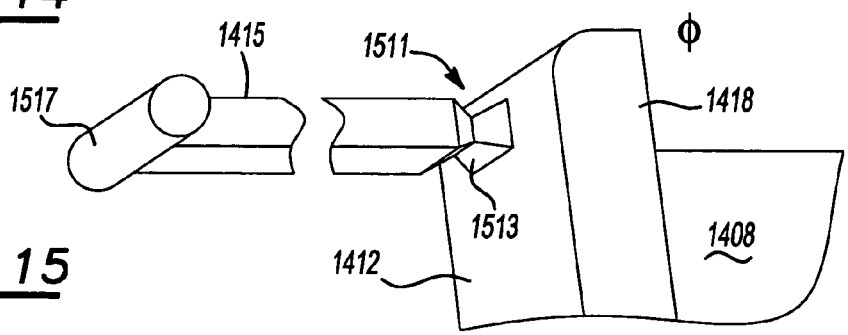
FIG. 15 is an enlarged detail view of a portion of the mounting bracket of FIG. 14 showing an arm of the mounting bracket.

Referring to FIGS. 14 and 15, the mounting bracket 1402 further includes an elongate arm 1415 that extends from the sidewall 1412. The arm 1415 is preferably located at a position on the sidewall 1412 that is opposite the hinge 1411, as best seen in FIGS. 13 and 14. The arm 1415 is pivotably connected to the sidewall 1412 at one end by way of a "living" hinge 1511 integrally formed in the mounting bracket 1402 between the arm 1415 and sidewall 1412 by a V-shaped groove 1513 that encompasses the perimeter of the arm 1415. In a preferred embodiment, the arm 1415 is capable of pivoting about the hinge 1511 for at least 90° in all directions relative to the sidewall 1412. At the end of the arm 1415 opposite the hinge 1511 is a handle portion 1517. The handle portion 1517 extends traverse to the longitudinal length of the arm 1415 in a T-shaped configuration, as seen in FIG. 15.

The second panel section 1409 preferably includes a plurality of fasteners 1419 which project from a bottom surface 1421 of the second panel section. The fasteners 1419 are shown to be "Christmas-tree"-type male projections that are designed to be received in corresponding apertures 829 at the mounting location 806. The fasteners 1419 serve to secure the mounting bracket 1402 at the mounting location 806, as discussed further below. Alternatively, any other suitable fastening device may be employed to affix the mounting bracket 1402 to the mounting location 806, such as threaded fasteners, a hook and loop fastener, or adhesive, for example.

Further, although the second panel section 1409 is shown to be a solid panel, it too may include an aperture or plurality of apertures. Alternatively, the second panel section 1409 may simply comprise a skeletal frame structure. Such modifications may serve to reduce the weight or cost of the mounting bracket 1402 component.

The mounting bracket 1402 is shown to be of a unitary construction. It is contemplated that the mounting bracket 1402 may be molded in one piece from plastic. However, other well-known materials and manufacturing techniques, including a sheet-metal stamping, among others, could be employed in the manufacture the mounting bracket 1402.

A speaker grille 1266 is also included in the mounting apparatus 1200 to provide a protective cover for the loudspeaker 100 and to create an aesthetically pleasing appearance for the installation at the mounting location 806.

The grille 1266 generally forms a planar front-side panel for the apparatus 1200. The grille 1266 includes a narrow, vertically extending slot 1269 that is offset to one side of the grille 1266. As best seen in FIG. 12, the slot 1269 is formed so as to include a series of protrusions 1270 that bulge from the opposing sidewalls 1272 of the slot 1269. The protrusions 1270 are configured in horizontally oriented pairs that create positive stop locations 1271 along the length of the slot 1269, as will be discussed in greater detail below.

The grille 1266 also includes plurality of male projections 1268 that are positioned about the periphery of the grille 1266. A corresponding plurality of female receptacles 870 are located in the exterior mounting surface 860 of the mounting location 806. The male projections 1268 are received within the female receptacles 870 to attach the grille 1266 at the mounting location in a manner as already described.

Figure 16:
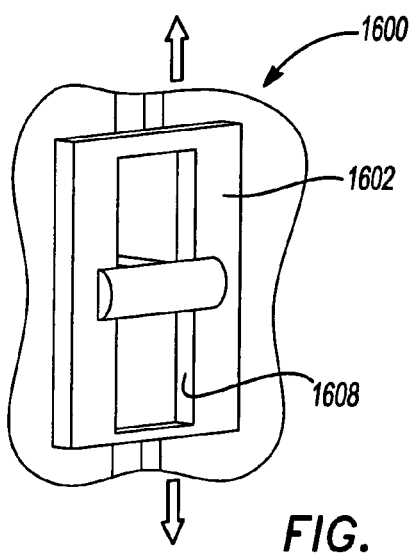
FIG. 16 is an enlarged detail front perspective view of a portion of the installation shown in FIG. 12.
Figures 18, 19:
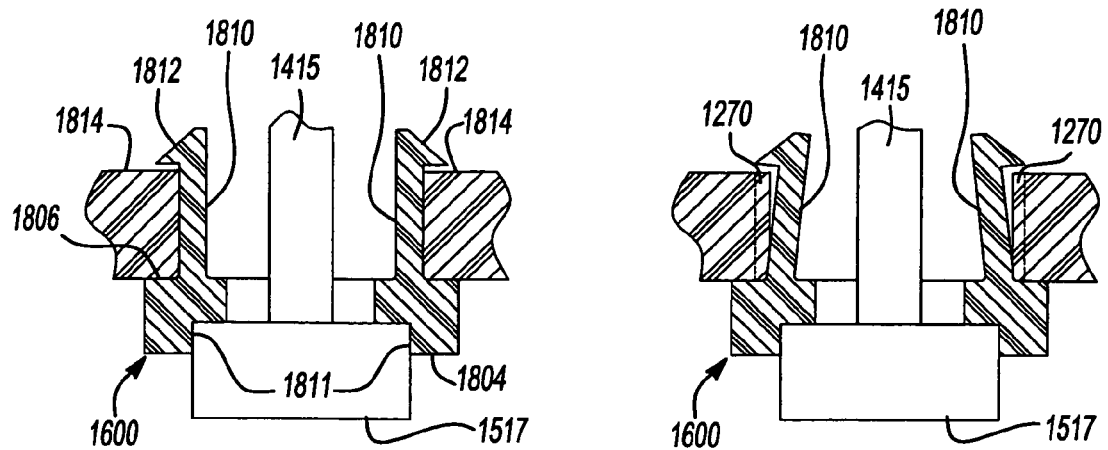
FIG. 18 is an enlarged detail cross-sectional view taken along the line 18—18 of FIG. 12.
FIG. 19 is an enlarged detail cross-sectional view taken along the line 19—19 of FIG. 12.

Received within the slot 1268 from the front side of the grille 1266 is a guide bracket or slide 1600. The slide 1600, which is best shown in FIGS. 16, 18 and 19, includes a rectangular base portion 1602 having a front side 1804 and a back side 1806. An aperture 1608 passes through the center portion of the slide 1600. Located near the center of the base portion 1602 and on opposite sides of the aperture 1608, are two semi-circular-shaped recesses 1811. The shapes of the recesses 1811 each generally conform to the shape of the handle portion 1517 of the arm 1415 of the mounting bracket 1402.

A pair of legs 1810 extend outwardly and orthogonally from the back side 1806 of the base portion 1602 (see FIGS. 18 and 19). Included at the end of each leg 1810 is a "Christmas tree"-type projection 1812 that enables the slide 1600 to be "snap-fit" into and engage the back side 1814 of the grille 1266.

Both the grille 1266 and the slide 1600 may each be molded from plastic.

In a preferred method for installation of the mounting apparatus 1200, the loudspeaker 100 is pre-assembled with the mounting bracket 1402 by sliding the loudspeaker 100 into the interior space 1416 of the first panel section 1408. The loudspeaker 100/mounting bracket 1402 assembly may then be installed in the cavity 858 of the mounting location 806 by way of the fasteners 1419 on the second panel section 1409 which are received and retained in apertures 1365 in an interior sidewall 864 of the mounting location 806. Once installed in the cavity 858, the second panel section 1409 is securely retained in at the mounting location 806, while the first panel section 1408 is free to pivot about the hinge 1411.

The grille 1266 and slide 1600 are also pre-assembled. In this regard, the legs 1810 of the slide 1600 are passed through the slot 1268 from the front side 1816 of the grille 1266, such that the legs 1810 are "snap fit" into the slot 1268 and retained there by the projections 1812 which engage the back side 1814 of the grille 1266. Once assembled with the grille 1266, the slide 1600 is free to move in and along the slot 1268.

The grille 1266/slide 1600 assembly may then be installed at the mounting location 806. However, prior to inserting the male projections 1268 of the grille 1266 into the female receptacles 870 in the exterior mounting surface 860, the arm 1415 is passed through both the slot 1268 of the grille 1266 and the aperture 1608 of the slide 1600. In order to accomplish this step, the orientation of the grille 1266 and/or arm 1415 may need to manipulated. Once the arm 1415 is passed through the grille 1266/slide 1600 assembly, the handle portion 1517 of the arm 1415 is deposited in the recesses 1811 of the slide 1600, as best shown in FIG. 16. A "snap-fit" construction may also be used to retain the handle portion 1517 in the recesses 1811, while simultaneously allowing for relative rotational movement between the handle portion 1517 and the recesses 1811.

Finally, the grille 1266 may be reoriented, as necessary, and attached at the mounting location 806 by way of the male projections 1268 and the female receptacles 870. The installation of the mounting apparatus 1200 then complete.

Once installed, the angular orientation of the loudspeaker 100 may be controlled by the slide 1600. Specifically, as illustrated in FIGS. 12 and 13, the position of the slide 1600 within the slot 1268 determines the angle of the loudspeaker 100 relative to the mounting location 806.

As the slide 1600 travels from one stop location 1271 to an adjacent stop location 1271 in the slot 1268, the legs 1810 of the slide 1600 come into contact and abut the protrusions 1270. As illustrated in FIG. 19, continued travel of the slide 1600 is accomplished when the legs 1810 are caused to flex inwardly and are thereby able to pass over the protrusions 1270. The legs 1810 return to an un-flexed state when the slide 1600 is moved to the adjacent stop location 1271.

Referring again to FIG. 13, vertical movement of the slide 1600 changes the angular orientation of the loudspeaker 100. As shown, when the slide 1600 moves vertically downward in the direction of arrow X, the handle 1517 on the arm 1415 of the mounting bracket 1402 moves with the slide 1600 and causes the arm 1415 to rotate in the direction of arrow Y. As the arm 1415 rotates, the first panel section 1408 is drawn in the direction of arrow Z, pivoting about the hinge 1411 and reducing the included angle between the first panel section 1408 and the second panel section 1409. Vertical movement of the slide 1600 in the opposite direction reverses the effect, and increases the included angle between the first panel section 1408 and the second panel section 1409.

The position of the slide 1600 may be manually established, such as by a user, at any one of the stop locations 1271 thereby adjusting the orientation angle for the loudspeaker. Alternatively, the position of the slide may be controlled electronically or electro-mechanically, and may even be associated with memory positioning apparatus that are commonly available in automobiles, such as for control of personalized seat and mirror positioning, for example.

Figure 20:
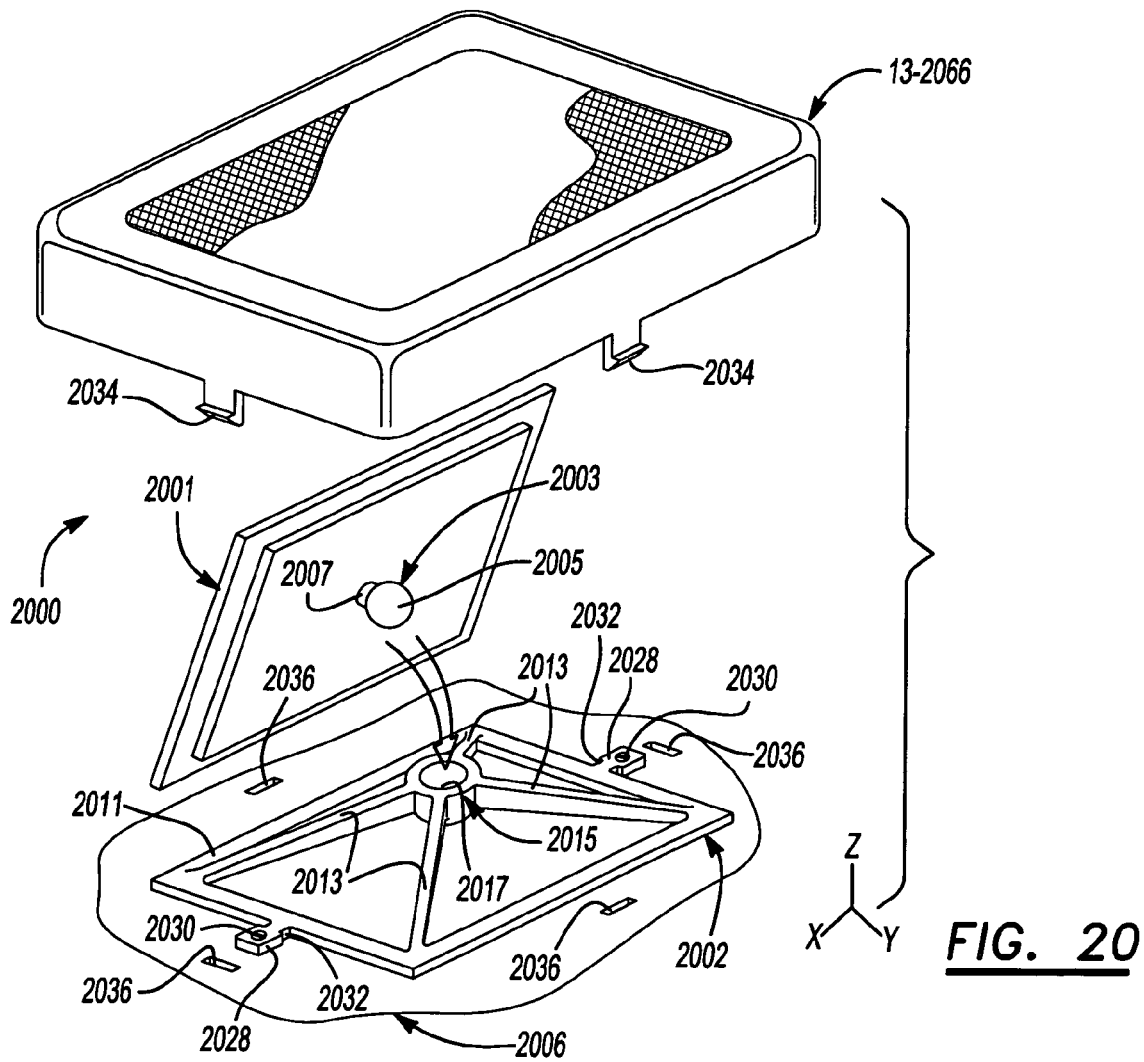
FIG. 20 is a three-quarter front perspective view of a mounting apparatus for mounting an electro-dynamic loudspeaker in a variable orientation relative to a mounting location.
Figure 21:
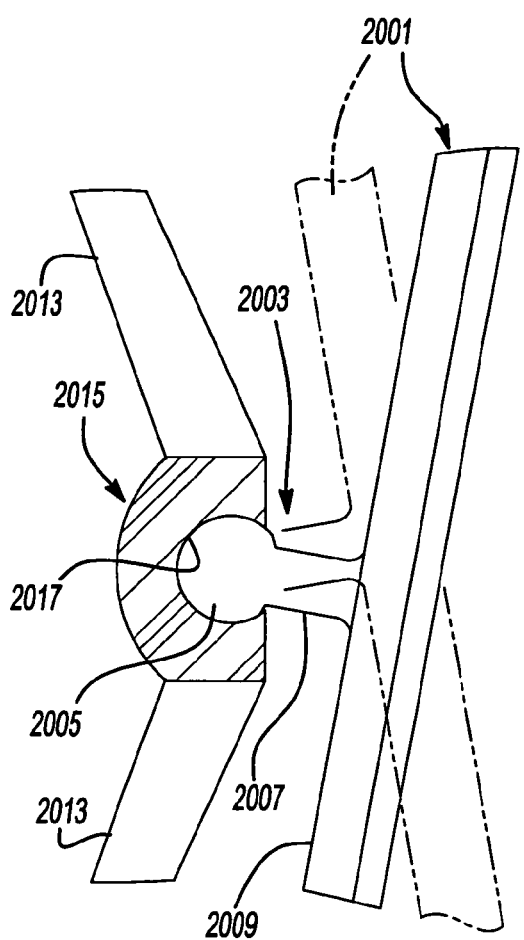
FIG. 21 is an enlarged cross-sectional side view detail of a portion of the mounting apparatus shown in FIG. 20.
Figure 22:
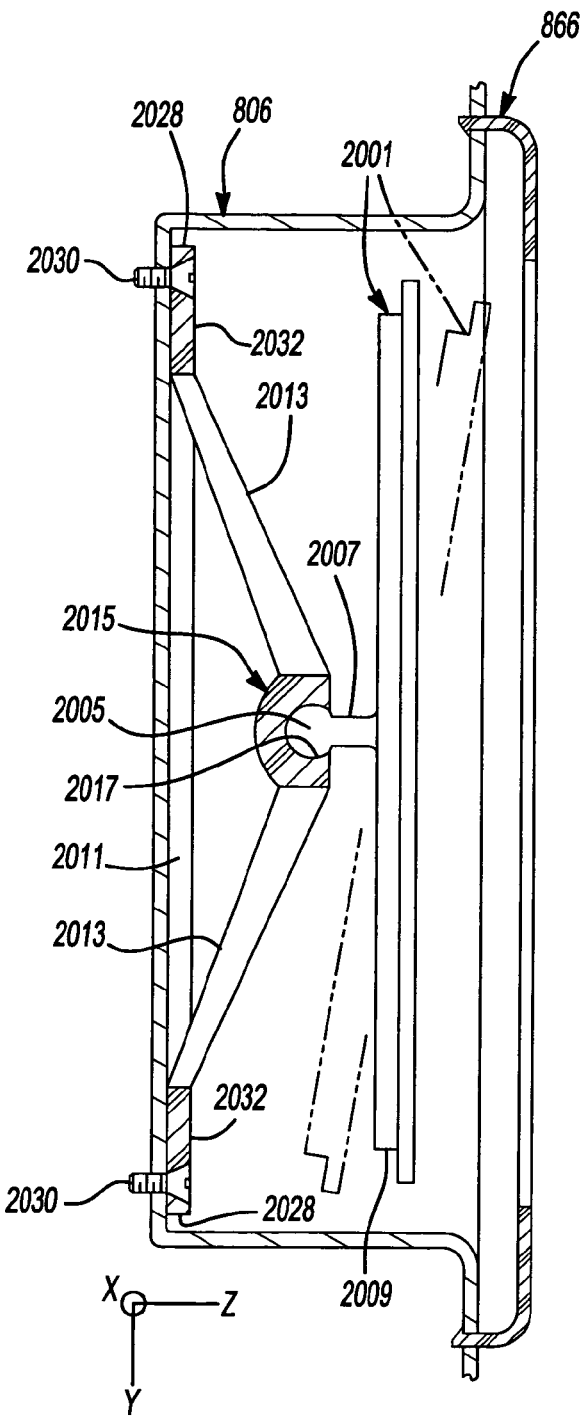
FIG. 22 is a cross-sectional side view of the mounting apparatus of FIG. 20 installed at a mounting location.

Yet an additional embodiment of a mounting apparatus 2000 of the invention is depicted in FIGS. 20 through 22. FIG. 20 generally illustrates the mounting apparatus 2000 as including a loudspeaker 2001, a mounting bracket 2002, and a trim piece 2066. The mounting apparatus 2000 is shown being installed at a mounting location 2006. FIG. 22 shows the mounting apparatus 2000 as installed at a mounting location 806, as has been previously described herein. Generally speaking, the mounting apparatus 2000 comprises a ball-and-socket-type arrangement that provides six degrees of freedom and enables the loudspeaker 2001 to be variably oriented about the x-axis, y-axis and z-axis of the mounting location 2006. 806.

In addition to the components and features of loudspeaker 100, the loudspeaker 2001 further includes a ball component 2003. The ball 2003 comprises a spherically-shaped male head portion 2005 and a neck portion 2007 which is located intermediate the head portion 2005 and the loudspeaker 2001. The neck portion 2007 serves as an attachment point for the ball 2003 to the loudspeaker 2001 and to offset the head portion 2005 a short distance from the loudspeaker's 2001 frame 2009.

The ball component 2003 may either be integrally formed as part of the frame 2009 of the loudspeaker 2001 or as a separate component that is attached to the loudspeaker 2001 at its frame 2009. If as a separate component, the ball 2003 component may be attached to the loudspeaker 2001 by an adhesive or by threads, for example. It is contemplated that the ball component 2003 may be molded from plastic, although any other suitable manufacturing material and method may be used.

A mounting bracket 2002 is shown to comprise a framework having a base 2011, a plurality of flanges 2028, a plurality of support legs 2013 and a socket component 2015. The base 2011 supports the mounting bracket 2002 at the mounting location 2006. A plurality of flanges 2028 extend from the base 2011 and provide locations at which the mounting bracket 2002 may be secured to the mounting location 2006, such as via a threaded fastener 2030, or as otherwise well-known or disclosed herein. The flanges 2028 may further include a neck portion 2032 that allow the position and/or orientation of the flanges 2028 to be manipulated, such as by bending or twisting, to better conform to the surface at the mounting location 2006. Of course, the number and location of the flanges 2028 may be determined by the requirements of the mounting apparatus 2000, such as the size, shape, and weight of, and the operating conditions seen by, the loudspeaker 2001 or other device that is to be mounted or the space available at the mounting location 2006.

A plurality of support legs 2013 project up from the base 2011 to the socket component 2015. The socket component 2015 is supported by the support legs 2013 in a location that is generally central to the framework and offset from the base 2011. The socket component 2015 comprises a spherically-shaped female receptacle portion 2017 having a diameter that is sized to closely match the diameter of the head portion 2005 of the ball component 2003.

The loudspeaker 2001 and mounting bracket 2002 are assembled by inserting the head portion 2005 of the ball component 2003 on the loudspeaker 2001 into the receptacle 2017 of the socket component 2015. Such assembly may be accomplished by any of several well-known methods, including a snap fit of the ball 2003 into the socket 2015. Assembly of the loudspeaker 2001 with the mounting bracket 2002 may be done either prior or subsequent to affixing the mounting bracket 2002 to the mounting location 2006.

As shown in FIG. 22, once assembled, the loudspeaker is rotatable and/or pivotable in any direction relative to the mounting bracket 2002. Further, the respective surfaces of the receptacle 2017 and/or the head portion 2005 may be formed from, coated by, or treated with, a suitable material that increases the coefficient of friction between the receptacle 2017 and the head portion 2005. In this manner, the loudspeaker 2001 may be securely held in any particular orientation simply by friction.

The mounting bracket 2002 is shown in FIG. 21 to be generally rectangular in shape. The mounting bracket 2002 may, of course, be of any size shape and configuration that is suitable to accommodate the particular device that is to be mounted or the space that is available at the mounting location 2006. Similarly as previously discussed, the mounting bracket 2002 is shown to be of unitary construction and it is contemplated that it may be molded in one piece from plastic.

As with the other embodiments of the invention discussed above, to provide both a protective cover and an aesthetically pleasing appearance for the installation, a trim piece 2066 may be attached at the mounting location 2006 by interlocking the male projections 2034 extending from the periphery of the trim piece 2066 in female receptacles 2036 at the mounting location 2006. As shown in FIG. 22, a grille 866 is similarly attached at mounting location 806.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A mounting bracket for retaining an electro-dynamic loudspeaker comprising a dish-shaped frame having an outwardly extending rim and a thin-film diaphragm attached to the rim under tension for providing a moveable membrane capable of producing sound, and mounting the electro-dynamic loudspeaker at a mounting location in a vehicle, comprising:
   a generally planar first panel;
   a sidewall extending from the first panel so as to define an interior space of the mounting bracket;
   a rib extending from the sidewall inwardly toward the interior space, the rib lying in a plane generally parallel to and offset a distance from the first panel, the rib operative to retain the electro-dynamic loudspeaker within the interior space;
   an arm pivotally connected to the sidewall;
   a second panel; and
   a hinge coupling the first panel and the second panel.

2. The mounting bracket of claim 1 where the arm further comprises a handle portion located at an end of the arm opposite the sidewall.

3. The mounting bracket of claim 2 where the handle portion extends transverse to the length of the arm.

4. The mounting bracket of claim 1 where the second panel comprises at least one fastener.

5. The mounting bracket of claim 4, where the at least one fastener comprises snap-fit-type male projections.

6. The mounting bracket of claim 1 where the second panel comprises a skeletal frame.

7. The mounting bracket of claim 1 where the second panel comprises at least one aperture.

8. The mounting bracket of claim 1 where the mounting bracket is integrally molded in one piece from plastic.

9. The mounting bracket of claim 1, where the hinge comprises a V-shaped groove located between the first panel and the second panel.

10. The mounting bracket of claim 1, where the first panel of the mounting bracket comprises at least one aperture.

11. The mounting bracket of claim 1, where the hinge comprises a V-shaped groove located between the first panel and the second panel.

12. The mounting bracket of claim 1, where the first panel is generally rectangular in shape and the sidewall extends from three sides of the first panel such that the mounting bracket includes an open end.

13. The mounting bracket of claim 1 further comprising means for attaching the electro-dynamic loudspeaker to the mounting bracket.

14. The mounting bracket of claim 13, where the means for attaching the electro-dynamic loudspeaker to the mounting bracket comprises an adhesive.

15. The mounting bracket of claim 13, where the means for attaching the electro-dynamic loudspeaker to the mounting bracket comprises a hook and loop fastener.

16. The mounting bracket of claim 1, where the loudspeaker has an overall thickness and the distance is approximately equal to the overall thickness.

17. The mounting bracket of claim 1, where the rim of the frame of the loudspeaker has a thickness and the distance is approximately equal to the thickness.

18. The mounting bracket of claim 1, where the back panel has a plurality of apertures.

19. A mounting apparatus comprising:
   a mounting bracket positioned at a mounting location within a vehicle;
   a grille; and
   a guide bracket;
   the mounting bracket comprising:
      a generally planar first panel;
      a sidewall extending from the first panel so as to define an interior space of the mounting bracket;
      a rib extending from the sidewall inwardly toward the interior space, the rib lying in a plane generally parallel to and offset a distance from the first panel, the rib operative to retain the electro-dynamic loudspeaker within the interior space;
      an arm pivotally connected to the sidewall;
      a second panel;
      a hinge coupling the first panel and the second panel;
      the grille comprising a vertically extending slot that is offset to one side of the grille;
      the guide bracket comprising a base portion having an aperture; and
      a plurality of legs extending from the base portion.

20. The mounting apparatus of claim 19 where the arm further comprises a handle portion located at an end of the arm opposite the sidewall.

21. The mounting apparatus of claim 20 where the handle portion extends transverse to the length of the arm.

22. The mounting apparatus of claim 19 where the second panel comprises at least one fastener.

23. The mounting apparatus of claim 19 where the second panel comprises a skeletal frame.

24. The mounting apparatus of claim 19 where the second panel comprises at least one aperture.

25. The mounting apparatus of claim 19 where the mounting bracket is integrally molded in one piece from plastic.

26. The mounting apparatus of claim 19, where the hinge comprises a V-shaped groove located between the first panel and the second panel.

27. The mounting apparatus of claim 19, where the slot in the grille comprises opposing sidewalls, each the sidewall including a plurality of protrusions.

28. The mounting apparatus of claim 27, where the plurality of protrusions are configured in horizontally-oriented pairs.

29. The mounting apparatus of claim 27, where the plurality of protrusions create stop locations along the length of the slot.

30. The mounting apparatus of claim 19, where the grille further comprises a plurality of fasteners about the periphery of the grille.

31. The mounting apparatus of claim 30, where the plurality of fasteners comprise snap-fit-type male projections.

32. The mounting apparatus of claim 19 where the guide bracket further comprises at least one recess adjacent to the aperture.

33. The mounting apparatus of claim 19 where the legs of the guide bracket are received in the slot of the grille in a first direction and the arm of the mounting bracket extends through the slot of the grille and the aperture of the guide bracket in a second direction.

34. The mounting apparatus of claim 19 where each of the legs of the guide bracket further comprise a projection for engaging the grille.

35. An audio component installation for a vehicle comprising:
   a mounting location in a vehicle;
   an electro-dynamic loudspeaker comprising a flat panel loudspeaker;
   a mounting apparatus comprising means for variably orienting the loudspeaker at an angle with respect to the mounting location;
   where the means for variably orienting the loudspeaker at an angle with respect to the mounting location comprises:
   a mounting bracket;
   a grille;
   a guide bracket;
   the mounting bracket comprising:
      a first panel;
      a sidewall extending from the first panel so as to define an interior space of the mounting bracket;
      a rib extending from the sidewall inwardly toward the interior space, the rib lying in a plane generally parallel to and offset a distance from the first panel, the rib operative to retain the loudspeaker within the interior space;
      an arm pivotally connected to the sidewall;
      a second panel;
      a hinge coupling the first panel and the second panel;
      the grille comprising a vertically extending slot that is offset to one side of the grille; and
      the guide bracket comprising a base portion having an aperture, and a plurality of legs extending from the base portion.

36. The audio component installation of claim 35, where the mounting location comprises a structure of an automobile.

37. The audio component installation of claim 36, wherein the mounting location comprises a structural pillar of the vehicle.

38. The audio component installation of claim 36, wherein the mounting location comprises the interior passenger compartment of the vehicle.

39. The audio component installation of claim 35, where the mounting location comprises a cavity formed by an exterior mounting surface, an interior mounting surface spaced a distance from the exterior mounting surface, and a plurality of interior sidewalls that span the distance between the interior mounting surface and the exterior mounting surface.

40. The audio component installation of claim 39, where the cavity is located in the interior passenger compartment of a vehicle at one of a door panel, a headliner, a seating unit, an overhead console, a floor console, an interior trim panel, a dashboard, or an instrument cluster.

* * * * *